United States Patent
Jung et al.

(10) Patent No.: US 9,858,197 B2
(45) Date of Patent: Jan. 2, 2018

(54) CACHE MANAGEMENT APPARATUS OF HYBRID CACHE-BASED MEMORY SYSTEM AND THE HYBRID CACHE-BASED MEMORY SYSTEM

(71) Applicant: SAMSUNG ELECTRONICS CO., LTD., Suwon-si, Gyeonggi-do (KR)

(72) Inventors: Myung-June Jung, Suwon-si (KR); Ju-Pyung Lee, Suwon-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 404 days.

(21) Appl. No.: 14/460,833

(22) Filed: Aug. 15, 2014

(65) Prior Publication Data

US 2015/0067258 A1    Mar. 5, 2015

(30) Foreign Application Priority Data

Aug. 28, 2013  (KR) .................. 10-2013-0102696

(51) Int. Cl.
*G06F 12/06*      (2006.01)
*G06F 12/08*      (2016.01)
*G06F 12/0897*   (2016.01)
*G06F 12/0868*   (2016.01)

(52) U.S. Cl.
CPC ...... *G06F 12/0897* (2013.01); *G06F 12/0868* (2013.01); *G06F 2212/1021* (2013.01); *G06F 2212/601* (2013.01)

(58) Field of Classification Search
CPC ............. G06F 12/0868; G06F 12/0897; G06F 2212/1021; G06F 2212/601
See application file for complete search history.

(56) References Cited

U.S. PATENT DOCUMENTS

| | | |
|---|---|---|
| 2011/0191522 A1 | 8/2011 | Condict et al. |
| 2012/0137055 A1 | 5/2012 | Lee et al. |
| 2012/0210058 A1 | 8/2012 | Mittendorff et al. |
| 2014/0229658 A1* | 8/2014 | Maharana ........... G06F 12/0866 711/103 |

(Continued)

FOREIGN PATENT DOCUMENTS

CN    103885815 A  *  6/2014

OTHER PUBLICATIONS

Xi Zhang et al., "A Cache Replacement Policy Using Adaptive Insertion and Re-Reference Prediction", 2010 22nd International Symposium on Computer Architecture and High Performance Computing, 2010 IEEE, pp. 95-102.

(Continued)

*Primary Examiner* — Yong Choe
(74) *Attorney, Agent, or Firm* — F. Chau & Associates, LLC

(57) ABSTRACT

A cache management apparatus includes an access pattern analysis unit configured to analyze an access pattern of each of one or more pages present in a first cache by monitoring data input/output (I/O) requests, a page class management unit configured to determine a class of each of the pages based on results of the analysis performed by the access pattern analysis unit, and a page transfer management unit configured to transfer one or more pages classified into a first class including pages to be transferred, to a second cache based on results of the determination performed by the page class management unit.

14 Claims, 16 Drawing Sheets

(56) References Cited

U.S. PATENT DOCUMENTS

2014/0297927 A1* 10/2014 Katori ................. G06F 12/0638
711/103
2014/0324785 A1* 10/2014 Gupta ............... G06F 17/30368
707/689

OTHER PUBLICATIONS

Feng Chen, et al., "Hystor: Making the Best Use of Solid State Drives in High Performance Storage Systems", ICS '11, May 31-Jun. 4, 2011, Tuscon, Arizona, USA.
Aamer Jaleel et al., High Performance Cache Replacement Using Re-Reference Interval Prediction (RRIP), ISCA '10, Jun. 19-23, 2010, Saint-Malo, France.
Gangyong Jia et al., "Cache Promotion Policy using Re-Reference Interval Prediction", 2012 IEEE International Conference on Cluster Computing pp. 534-537.
Dongchul Park, et al., "A Workload-Aware Adaptive Hybrid Flash Translation Layer with an Efficient Caching Strategy", MASCOTS, 2011 IEEE 19th International Symposium.
Richard P. Spillane, et al., "An Efficient Multi-Tier Tablet Server Storage Architecture", Proceedings of the 2nd ACM Symposium on Cloud Computing (SOCC 2011), Oct. 27-28, 2011, Cascais, Portugal, pp. 1-14.
A. Aldahlawi et al., "An Empirical and Architectural Study of Using an SSD-Aware Hybrid Storage System to Improve the Performance of the Data Intensive Applications", International Journal of Information and Electronics Engineering, vol. 2, No. 5, Sep. 2012, pp. 730-740.

* cited by examiner

CACHE MANAGEMENT APPARATUS OF HYBRID CACHE-BASED MEMORY SYSTEM AND THE HYBRID CACHE-BASED MEMORY SYSTEM

CROSS-REFERENCE TO RELATED APPLICATION

This application claims priority to Korean Patent Application No. 10-2013-0102696 filed on Aug. 28, 2013 in the Korean Intellectual Property Office, the disclosure of which is incorporated by reference in its entirety herein.

BACKGROUND

1. Technical Field

The present inventive concept relates to a cache management apparatus and method of a hybrid cache-based memory system and the hybrid cache-based memory system.

2. Discussion of Related Art

Random access memory (RAM)-based caches, which can be managed by the kernel of an operating system (OS), are widely used to quickly process data input/output (I/O) requests. However, RAM-based caches use RAMs, which are relatively expensive as compared to other storage devices such as a hard disk drive (HDD) or a solid-state drive (SSD), and are generally spatially limited. RAM-based caches have an idle RAM region, which is a region of the RAM that is currently not being used as a cache. Accordingly, as the number of requests for RAM space increases, the area of an available cache region decreases, and the performance of the RAM-based cache deteriorates, thereby resulting in fluctuations in overall system performance.

SUMMARY

At least one embodiment of the present inventive concept provides a cache management apparatus and method which enables a cache allocated to an auxiliary memory device to be driven on a page cache layer.

At least one embodiment of the present inventive concept also provides a memory system capable of stably securing cache space and improving the performance of data input/output (I/O) processing by using a cache management apparatus.

According to an exemplary embodiment of the present inventive concept, there is provided a cache management apparatus including an access pattern analysis unit configured to analyze an access pattern of each of one or more pages present in a first cache by monitoring data input/output (I/O) requests, a page class management unit configured to determine a class of each of the pages based on results of the analysis performed by the access pattern analysis unit, and a page transfer management unit configured to transfer one or more pages classified into a first class including pages to be transferred, to a second cache based on results of the determination performed by the page class management unit.

According to an exemplary embodiment of the present inventive concept, there is provided a memory system including a main memory device configured to include a first cache, an auxiliary memory device configured to include a second cache, and a cache management apparatus configured to analyze an access pattern of each of one or more pages present in the first cache by monitoring data I/O requests, to determine a class of each of the pages based on results of the analysis, and to transfer one or more pages classified into a first class including pages to be transferred to the second cache based on results of the determination.

According to an exemplary embodiment of the invention, a cache memory system includes a first cache, a second cache, and a processor configured to store frequently accessed pages in the first cache, predict whether one of the pages not requested within a first predetermined amount of time will be requested within a second predetermined amount of time after the first predetermined amount of time, and move the one page from the first cache to the second cache when the prediction indicates the one page will be requested.

BRIEF DESCRIPTION OF THE DRAWINGS

The present inventive concept will become more apparent by describing in detail exemplary embodiments thereof with reference to the attached drawings, in which.

DETAILED DESCRIPTION

The present invention will now be described more fully hereinafter with reference to the accompanying drawings, in which exemplary embodiments of the invention are shown. This invention may, however, be embodied in different forms and should not be construed as limited to the exemplary embodiments set forth herein. The same reference numbers indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. The use of the terms "a" and "an" and "the" and similar referents in the context of describing the invention (especially in the context of the following claims) are to be construed to cover both the singular and the plural, unless otherwise indicated herein or clearly contradicted by context.

A cache management apparatus and method of a hybrid cache-based memory system and the hybrid cache-based memory system according to exemplary embodiments will hereinafter be described with reference to the accompanying drawings.

Figure 1A:
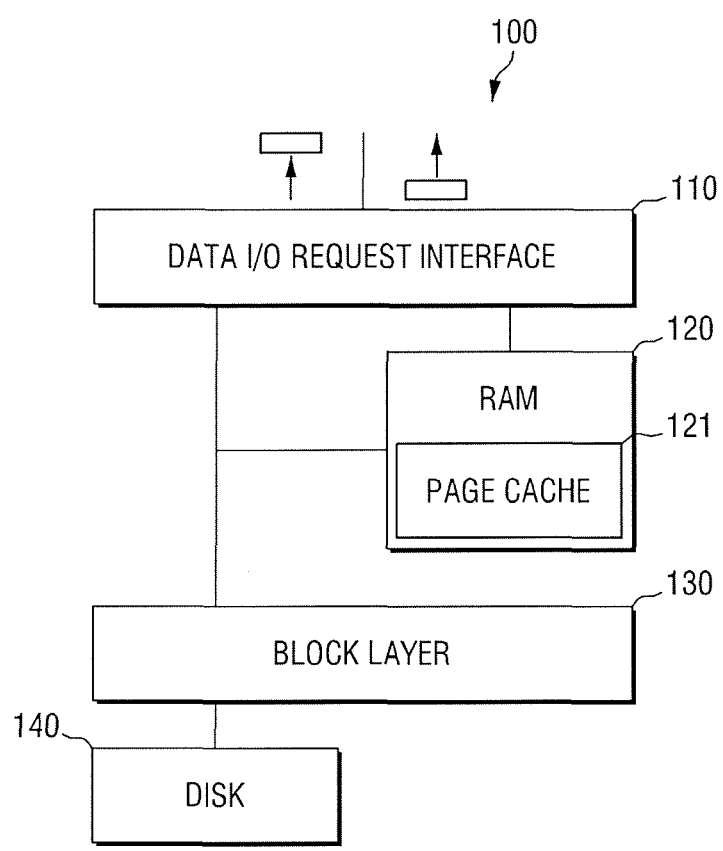
FIGS. 1A and 1B are diagrams illustrating a random access memory (RAM)-based page cache memory system.
Figure 1B:
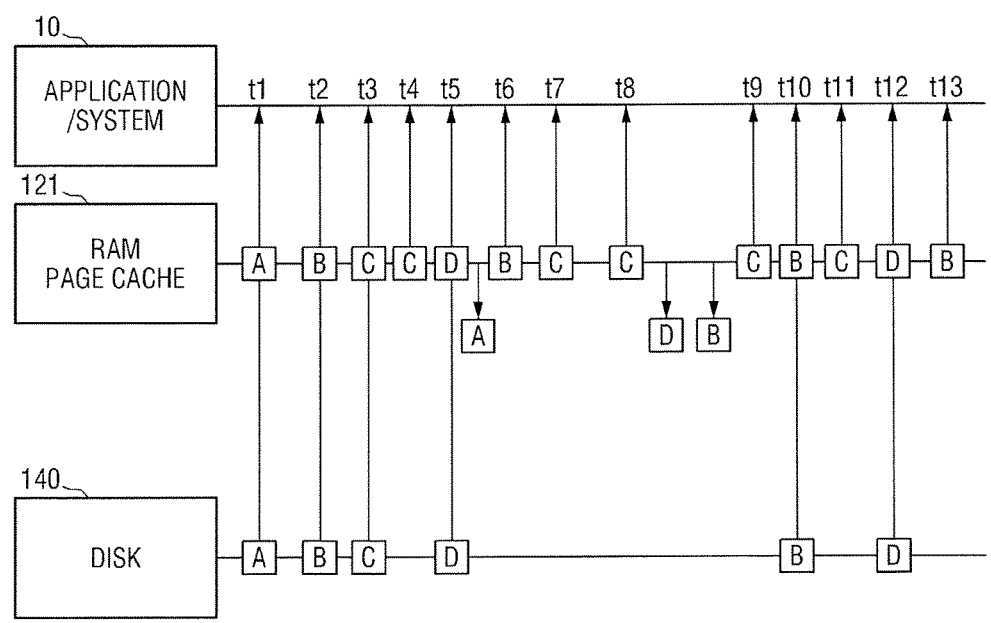

FIGS. 1A and 1B are diagrams illustrating a random access memory (RAM)-based page cache memory system.

Referring to FIG. 1A, a RAM-based page cache memory system 100 allocates a page cache 121 to a RAM 120 (e.g., a main memory device), and services data in the page cache 121 in response to the receipt of an input data input/output (I/O) request received via a data I/O request interface 110. More specifically, in response to the input data I/O request being received, the kernel of an operating system (OS) determines whether data requested by the input data I/O request exists in the page cache 121. In response to the requested data existing in the page cache 121, the OS kernel outputs the requested data present in the page cache 121 via the data I/O request interface 110 without the need to access a disk 140 (e.g., an auxiliary memory device). On the other hand, in response to the requested data not existing in the page cache 121, the OS kernel reads the requested data from a predetermined physical address in the disk 140 via a block layer 130, and services the read data via the data I/O request interface 110. To promptly process any future data I/O request for the read data, the read data may be stored in the page cache 121.

For example, referring to FIG. 1B, since data A, data B, and data C, which are requested by an application 10 at times t1, t2, and t3, respectively, do not exist in the page cache 121, data A, data B, and data C may be serviced by being read from the disk 140, and may then be stored in the page cache 121. In response to a data I/O request for data C being made at times t4, t7, t8, t9, and t11, respectively, data C may continue to be serviced from the page cache 121. On the other hand, in response to there being no further data I/O requests for data A, data B, and data D for a predetermined amount of time managed by the OS kernel, data A may be discarded from the page cache 121 after a time t5, and data D and data B may be discarded from the page cache 121 between the times t8 and t9.

In response to a data I/O request for data B being made at a time t10, data B may be serviced by being read from the disk 140, and may then be stored again in the page cache 121.

Since the RAM-based page cache memory system 100 is based on the RAM 120, which generally has a high operating speed, the RAM-based page cache memory system 100 can quickly service data in response to the receipt of a data I/O request, but suffers from a limited storage capacity of page cache.

Figure 2A:
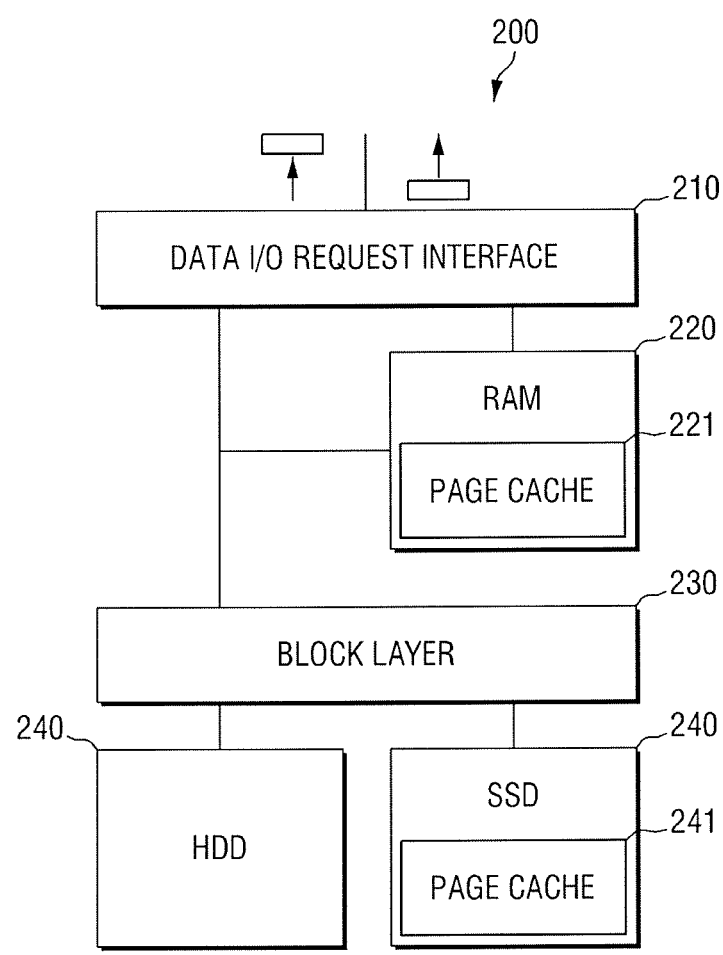
FIGS. 2A and 2B are diagrams illustrating a hybrid block page cache memory system.
Figure 2B:
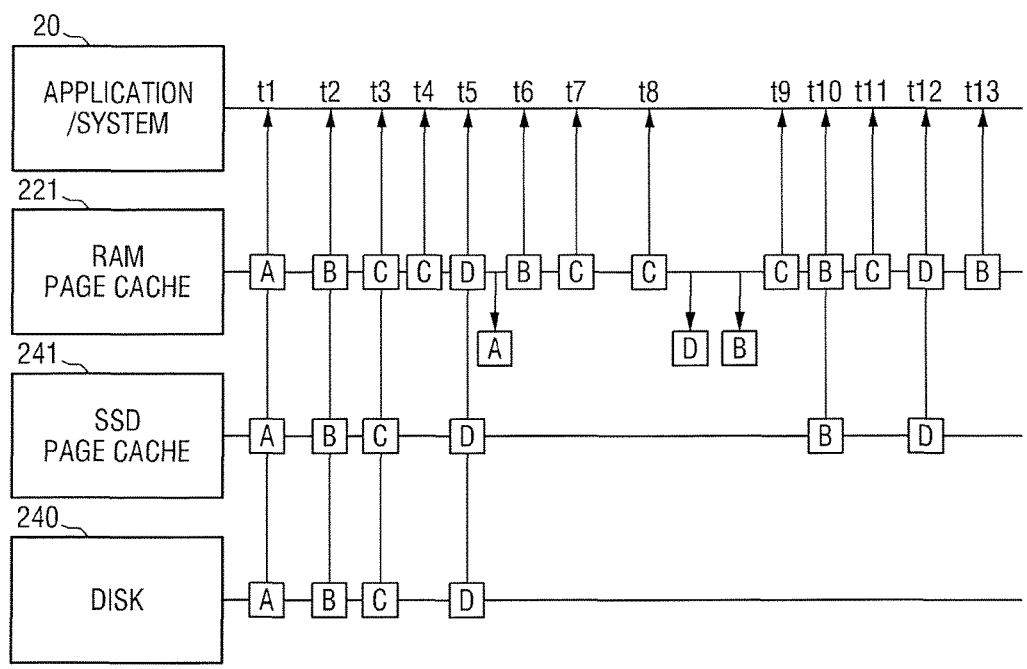

FIGS. 2A and 2B are diagrams illustrating a hybrid block page cache memory system.

Referring to FIG. 2A, a hybrid block page cache memory system 200 services data by not only using a first page cache 221 allocated to a RAM 220, but also using a second page cache 241 allocated to an auxiliary memory device (for example, a solid-state drive (SSD)) having relatively large storage capacity. Accordingly, the cache memory system 200 has a much greater cache capacity than the RAM-based page cache memory system 100. The SSD and a HDD are part of a disk 240.

However, the hybrid block page cache memory system 200 manages the second page cache 241, which is allocated to the SSD, through a block layer 230 and thus is limited in its ability to increase its cache hit ratio.

More specifically, referring to FIG. 2B, since data A, data B, data C, and data D, which are requested by an application 20 at times t1, t2, t3, and t5, respectively, do not exist in the first page cache 221, a determination may be made through the block layer 230 as to whether data A, data B, data C, and data D exist in the second cache 241. Since data A, data B, data C, and data D also do not exist in the second cache 241, data A, data B, data C, and data D may be serviced by being read from the disk 240, and may then be stored in each of the first page cache 221 and the second page cache 241.

In response to a data I/O request for data C being made at times t4, t7, t8, t9, and t11, respectively, data C may continue to be serviced directly from the first page cache 221. On the other hand, in response to there being no further data I/O requests for data A, data B, and data D for a predetermined amount of time managed by the kernel of an OS, data A may be discarded from the first page cache 221 after a time t5, and data D and data B may be discarded from the first page cache 121 between the times t8 and t9. Since data B has yet to be discarded from the second page cache 241, data B may be serviced by being read from the second page cache 241 and may then be stored again in the first page cache 221 upon receiving a data I/O request for data B at a time t10.

The memory system 200 has a much greater cache storage capacity as compared to system 100, which uses a single page cache with a more limited cache storage capacity. However, since there is frequently-requested data such as data C continuing to be serviced from the first page cache 221, whereas there are other data such as data A rarely being requested, the frequency of access to the second page cache 241 may become very low. That is, even though the cache hit ratio of the second page cache 241 is low, data that is less likely to be accessed needs to be stored in the second page cache 241, thereby resulting in a waste of storage space.

Figure 3A:
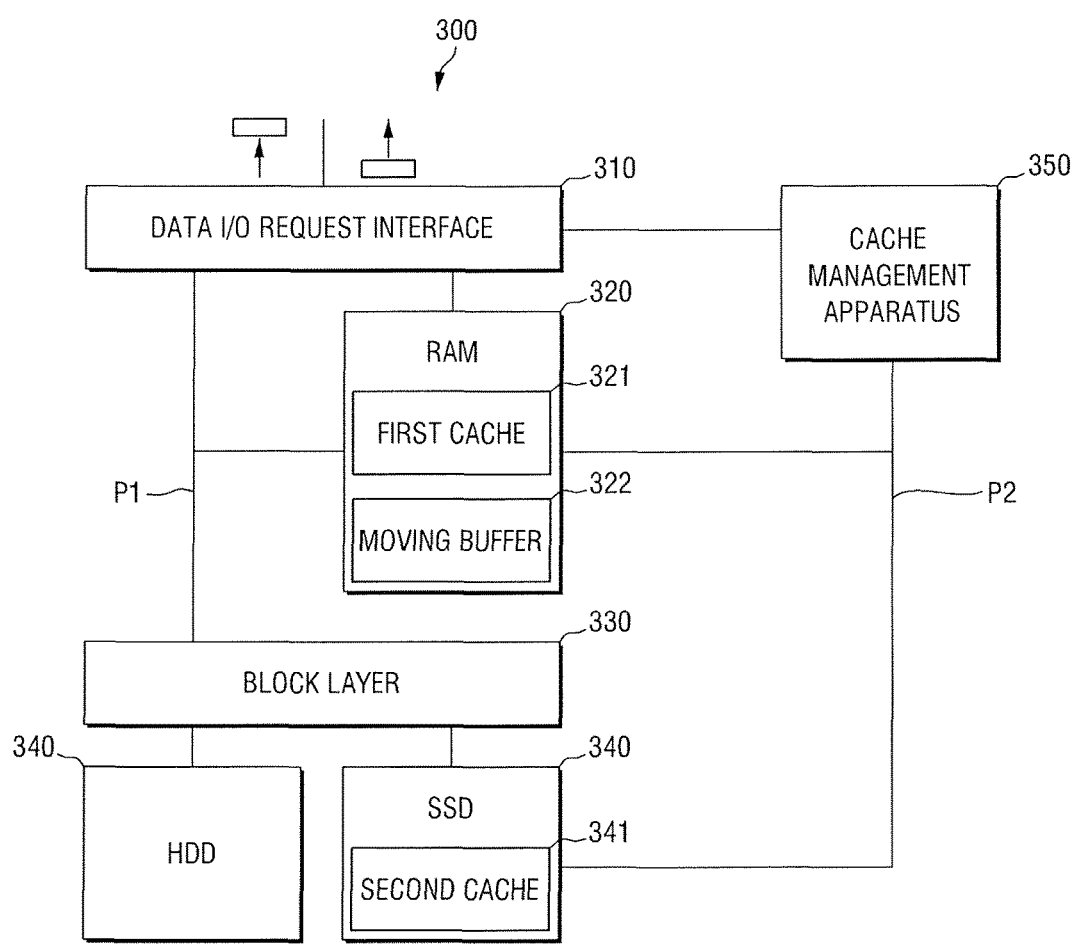
FIGS. 3A and 3B are diagrams illustrating a hybrid page cache memory system according to an exemplary embodiment of the inventive concept.
Figure 3B:
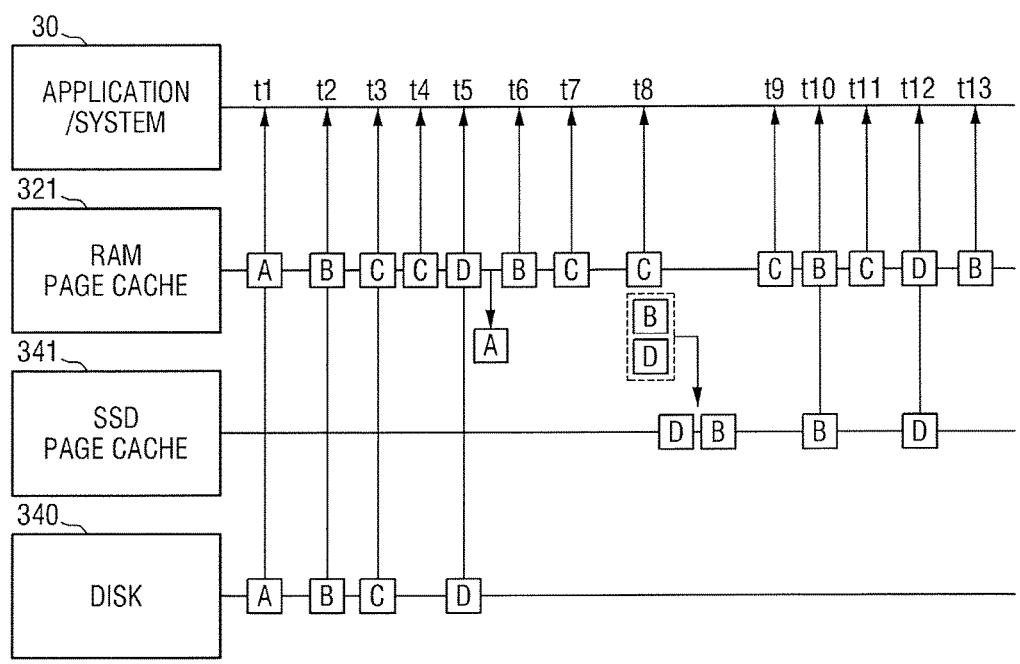

FIGS. 3A and 3B are diagrams illustrating a hybrid page cache memory system according to an exemplary embodiment of the inventive concept.

Referring to FIG. 3A, a hybrid page cache memory system 300 includes a main memory device 320 and auxiliary memory devices 340.

The main memory device 320 may be a RAM-based inactive memory. In an example, the main memory device 320 includes an inactive memory such as a magnetic RAM (MRAM), a phase-change RAM (PRAM), or a dynamic RAM (DRAM).

The auxiliary memory devices 340 may include at least one of a NAND flash-based inactive memory, such as a SSD, a PRAM, or an MRAM, or a hard disk drive (HDD). The auxiliary memory devices 340 are depicted in FIG. 2A as an HDD and an SSD, but are not limited thereto.

The main memory device 320 includes a first cache 321, and the auxiliary memory devices 340 include a second cache 341. To improve the performance of data I/O request processing, the second cache 341 may be allocated to the SSD of the auxiliary memory devices 340, which can provide a higher I/O processing speed than the HDD 340. The SDD of the auxiliary memory devices 340 may include a single SSD, a redundant array of independent disks (RAID), or an array of SSDs. The hybrid page cache memory system 300 may also include a cache management apparatus 350, which enables a data I/O request to be processed in the first cache 321 or the second cache 341 without passing through a block layer 330 of a kernel.

The cache management apparatus 350 may monitor data I/O requests that have been received via a data I/O request interface 310, may analyze the access pattern of each page stored in the first cache 321, and may classify one or more pages stored in the first cache 321 into one of a plurality of classes based on the results of the analysis.

In an example, the classes may include "class-1", which includes pages (e.g., frequently accessed pages) that are stored in the first cache 321 and can be prevented from being arbitrarily discarded by the kernel of an OS, "class-2", which includes pages (e.g., not frequently accessed, but is predicted to be accessed in the near future) that are stored in the second cache 341 and can be prevented from being arbitrarily discarded by the OS kernel, and "class-3", which includes pages (e.g., not frequently accessed) that are stored in the first cache 321 and can readily be discarded by the OS kernel.

In response to the classification of the pages stored in the first cache 321 being complete, the cache management apparatus 350 transfers one or more pages classified into "class-2" to the second cache 341 so as to store the corresponding pages in the second cache 341.

Referring further to FIG. 3A, the hybrid page cache memory system 300 may also include a moving buffer 322. The moving buffer 322 is implemented in the main memory device 320, which includes the first cache 321.

In response to the classification of the pages stored in the first cache 321 being complete, the cache management apparatus 350 stores page information relating to the pages classified into "class-2" in the moving buffer 322. The page information may include link information of each of the pages classified into "class-2", rather than the whole information on each of the pages classified into "class-2". In an example, the link information is a pointer to a page present in another memory such as HDD. In an embodiment where link information of one or more pages present in the first cache 321 is stored in the moving buffer 322, the cache management apparatus 350 transmits write request information including page information relating to the pages to the second cache 341 based on the link information upon the occurrence of a situation that satisfies a predefined policy.

In an embodiment, the cache management apparatus 350 determines whether there is a sufficient storage space available in the second cache 341. In response to there not being a sufficient storage space available in the second cache 341, the cache management apparatus 350 transmits a request for securing storage space to the auxiliary memory device 340 having the second cache 341.

In response to the receipt of the write request information, the auxiliary memory device 340 having the second cache 341 (i.e., the SDD), stores the page information included in the write request information in the second cache 341 on a page chunk-by-page chunk basis. The SDD of the auxiliary memory devices 340 may secure storage space in the second cache 341 according to a predefined set of rules by, for example, erasing page chunks from the second cache 341 either in response to the receipt of storage space request information from the cache management apparatus 350 or at regular intervals of time.

A predefined policy for securing storage space in the second cache 341 may be set in advance. In an example, the predefined policy includes a policy of erasing page chunks in order of the times when pages included in the page chunks were stored in the second cache 341, erasing page chunks in order of the amount of predetermined metadata included in the corresponding pages, or arbitrarily selecting and erasing page chunks.

In response to metadata update request information for a predetermined page being received from the cache management apparatus 350 or the processing of a data I/O request for the predetermined page being complete, the auxiliary memory device 340 updates metadata of the predetermined page. In an example, the metadata of the predetermined page includes "_to_be_discarded" indicating the predetermined page can be arbitrarily discarded from the second cache 341 and "_now_in_tier_1" indicating that the predetermined page is cached in the second cache 341 and can thus be serviced from the second cache 341 in response to the receipt of a data I/O request, and that the predetermined page is also cached in the first cache 321. While text such as "_to_be_discarded" and "_now_in_tier_1" for the metadata is described above, the inventive concept is not limited to any particular string and accordingly may vary in alternate embodiments.

In a case in which data requested by a data I/O request exists neither in the first cache 321 nor in the second cache 341, the data may be read from the auxiliary memory devices 340, and the read data may be serviced along a path P1 that passes through the block layer 330. In this case, the serviced data is stored in the first cache 321, but not in the second cache 341.

That is, in a case in which data requested by a data I/O request is not present in the first cache 321 and the second cache 341, the data I/O request is handled by using the auxiliary memory devices 340. Data obtained by accessing the auxiliary memory devices 340 in accordance with a data I/O request is stored only in the first cache 321. Only some of the pages present in the first cache 321 are selectively stored in the second cache 341 according to their class, and this will be described later in further detail.

In a case in which data requested by a data I/O request does not exist in the first cache 321, but exists in the second cache 341, the data is serviced from the second cache 341, and is then stored in the first cache 321.

The transfer of data from the first cache 321 to the second cache 341 may be performed along a path P2 without passing through the block layer 330. Even though data can be serviced from the second cache 341 along the path P1 that passes through the block layer 330 in response to the receipt of a data I/O request, the data can also be serviced from the second cache 341 through the path P2 without passing through the block layer 330.

In an exemplary embodiment, the first cache 321 has a latency and a capacity lower than that of the second cache 341.

FIG. 3B illustrates how to access the first cache 321 and the second cache 341 in the hybrid page cache memory system 300 in response to the receipt of a data I/O request.

Referring to FIG. 3B, in the hybrid page cache memory system 300, unlike in the hybrid block page cache memory system 200 of FIGS. 2A and 2B, data A, data B, data C, and data D, which are serviced from an auxiliary memory device 340 (e.g., a disk) in response to the receipt of data I/O requests at times t1, t2, t3, and t5, respectively, from an application 30, are stored in the first cache 321, but not (at least immediately) in the second cache 341. In the hybrid page cache memory system 200, in response to there being no further data I/O requests for data A, data B, and data D for a predetermined amount of time managed by the kernel of an OS, data A may be discarded from the first page cache 221 by the OS after the time t5 and data D and data B may be discarded from the first page cache 221 between the times t8 and t9, as illustrated in FIG. 2B.

On the other hand, in the hybrid page cache memory system 300, data A, data B, and data D are classified according to their access patterns. Since data A is classified as "class-3" and data B and D are classified as "class-2", data A may be discarded at the time t5, and data B and data D may be transferred to the second cache 341. In response to data I/O requests for data B and data D being received at times t10 and t12, respectively, data B and data D may be serviced from the second cache 341, and may then be stored again in the first cache 321.

In the embodiment of FIGS. 3A and 3B, data of a page that is discarded from the first cache 321 by the kernel for not being requested for the predetermined amount of time managed by the kernel, but needs to be serviced from a cache because of the possibility of being requested by a data I/O request at regular intervals of time may be stored in the second cache 341 in units of page chunks. Accordingly, it is possible to efficiently use the storage space in the second cache 341 and increase the cache hit ratio of the second cache 341. Especially when the second cache 341 is allocated to an SSD, which has write and erase limitations due to its characteristic of wearing out, the wearability of the SSD can be effectively managed by not immediately storing unnecessary data in the second cache 341.

Figure 4:
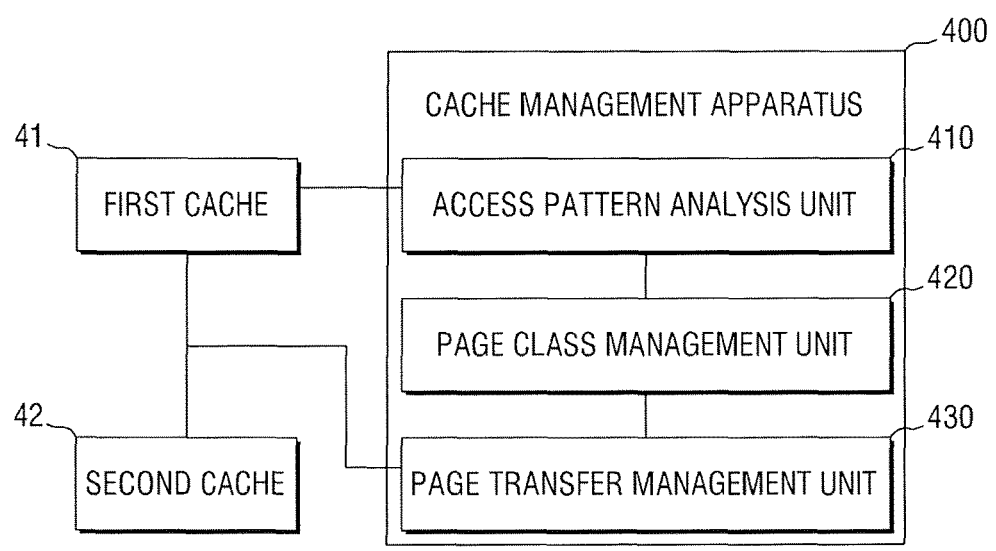
FIG. 4 is a block diagram illustrating a cache management apparatus according to an exemplary embodiment of the inventive concept.

FIG. 4 is a block diagram illustrating a cache management apparatus according to an exemplary embodiment of the inventive concept. The cache management apparatus 350 of FIG. 3A may be replaced with a cache management apparatus 400 illustrated in FIG. 4.

Referring to FIG. 4, the cache management apparatus 400 includes an access pattern analysis unit 410, a page class management unit 420, and a page transfer management unit 430. In an exemplary embodiment, elements 350, 400, 410, 420, and 430 are implemented by one or more processors.

The access pattern analysis unit 410 monitors data I/O requests. The access pattern analysis unit 410 may analyze the access pattern of each page serviced from a first cache 41 by the data I/O requests and each page serviced from a second cache 42 or a disk (not illustrated) by the data I/O requests and then stored in the first cache 41. The first cache 41 may correspond to first cache 321 and the second cache 42 may correspond to the second cache 341.

In an example, the access pattern analysis unit 410 calculates an access count, which is the number of data I/O requests that have been issued for each page for a predefined period of time, and analyzes the access pattern of each page based on the results of the calculation. In an alternative example, the access pattern analysis unit 410 calculates an access interval, which is the interval at which a data I/O request has been issued for each page, and analyzes the access pattern of each page based on the results of the calculation.

In the cache memory system 100 of FIG. 1A or 2A, least recently used (LRU) pages are replaced with other pages or are simply discarded from a page cache, and pages that need to continue to be stored in the page cache and pages to be discarded at any time are determined based merely on recency. On the other hand, in the embodiment of FIG. 4, the cache management apparatus 400 analyzes the access pattern of each page based on various information such as an access count or an access interval, and controls pages that are frequently requested by data I/O requests to be serviced from the first cache 41 and control pages that are not currently requested, but have the potential to be requested soon, to be serviced from the second cache 42. Accordingly, the cache management apparatus can efficiently manage the first cache 41 and the second cache 42.

The page class management unit 420 determines the class of each page based on the results of the analysis of the access pattern of each page. A plurality of classes may be defined in advance in various manners. In an example, pages to be serviced from the first cache 41 are classified as "class-1", pages to be serviced from the second cache 42 are classified as "class-2", and pages to be discarded from the first cache 41 at an arbitrary time are classified as "class-3".

Figure 5A:
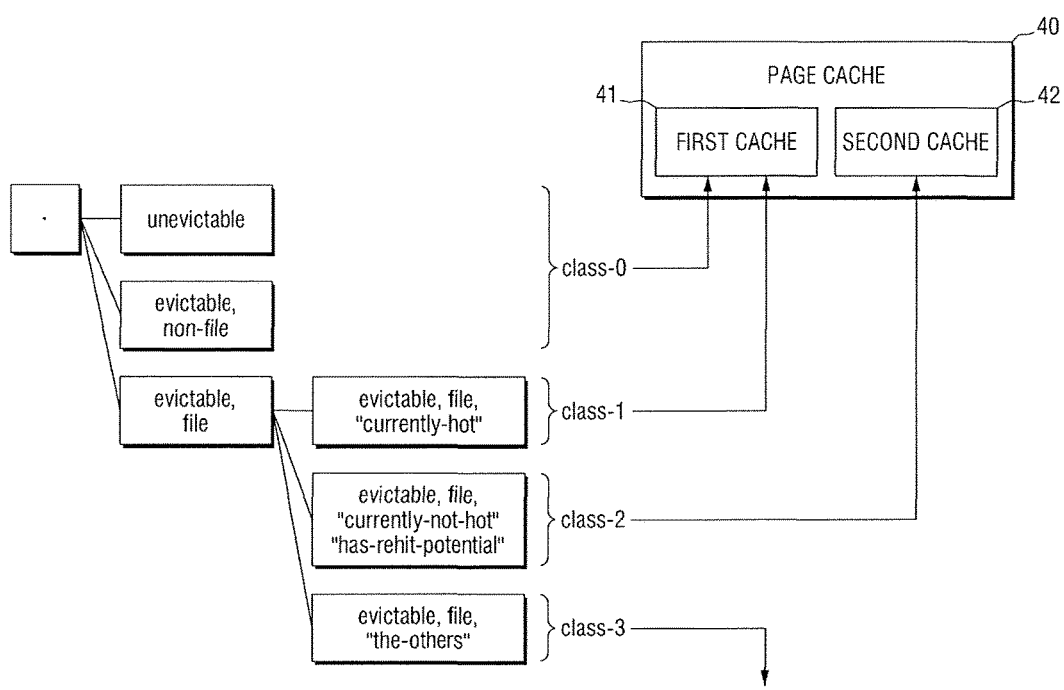
FIG. 5A is a diagram illustrating an example of classes that are used in the cache management apparatus to classify pages.

More specifically, referring to FIG. 5A, the classes that the cache management apparatus 400 uses to classify each page include "class-0", "class-1", "class-2", and "class-3". Pages present in the first cache 41 may be classified as "evictable" pages that can be arbitrarily discarded and "unevictable" pages that are reserved for predetermined purposes by a system such as a kernel and thus must not be discarded. The "evictable" pages may be further divided into "evictable, file" pages that are related to a file and "evictable, non-file" pages that are not related to a file.

The "unevictable" pages, which must not be arbitrarily discarded, and the "evictable, non-file" pages, which are pages that can be arbitrarily discarded and are not related to a file, may be classified in advance as "class-0". The "evictable, file" pages, which are pages that can be arbitrarily discarded and are related to a file, may be further divided into "currently-hot" pages that are currently frequently requested by data I/O requests, and "has-rehit-potential" pages (or "currently-not-hot") that are not currently frequently requested, but have the potential to be requested, and "the-others" pages. The "currently-hot" pages may be classified as "class-1", the "has-rehit-potential" (or "currently-not-hot") pages may be classified as "class-2", and the "the-others" pages may be classified as "class-3".

In an example, the "evictable, file" pages, which are pages that can be arbitrarily discarded and are related to a file, may be managed by the cache management apparatus 400, i.e., may be transferred from the first cache 41 to the second cache 42 by the cache management apparatus 400. However, the classification of pages is not limited to this example. That is, the cache management apparatus 400 may manage pages other than the "evictable, file" pages, and may classify pages in a different manner from that set forth herein.

Referring back to FIG. 4, the page class management unit 420 may classify pages present in the first cache 41 into one of "class-1", "class-2", and "class-3" based on the results of the analysis of the access pattern of the pages (particularly, "evictable, file" pages).

The page class management unit 420 may store predetermined information in a moving buffer (not illustrated) (such as the moving buffer 322 of FIG. 3A) for allowing "class-1" pages to continue to be serviced from the first cache 41 and controlling "class-2" pages to be transferred to the second cache 42 and thus to be serviced from the second cache 42, as illustrated in FIG. 5A. The predetermined information may be link information of the pages present in the first cache 41.

Figure 5B:
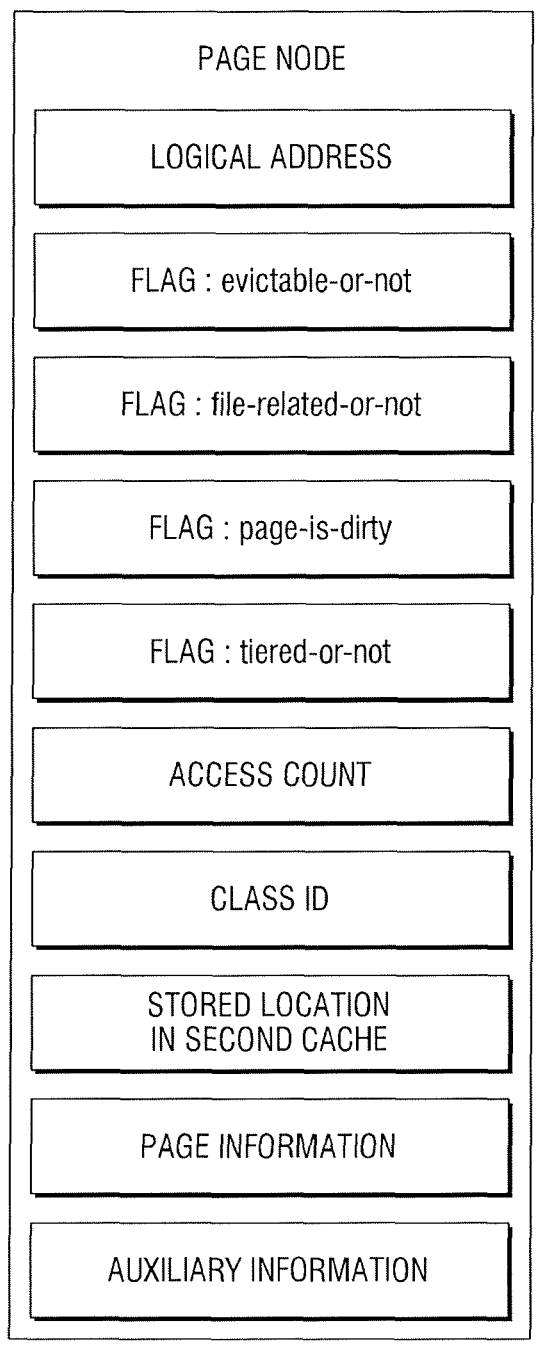
FIG. 5B is a diagram illustrating an example of a page node managed by the cache management apparatus.

FIG. 5B illustrates an example of a page node managed by the cache management apparatus 400. A page node may be structured and managed in various forms such as a radix tree, a hash table, or a linked list. By using a page node, a desired page can be easily found and obtained.

Referring to FIG. 5B, the page node may include: a logic address indicating an actual location in a disk where data cached in the first cache 41 is actually stored; an "evictable-or-not" flag indicating whether the data is evictable by an OS; a "file-related-or-not" flag indicating whether or not a page is related to a file; a "page-is-dirty" flag indicating whether an update in the data of the page has been reflected into the disk; a "tiered-or-not" flag indicating whether the page is a page transferred to the second cache 42; an access count calculated by the access pattern analysis unit 410; a class identifier (ID) determined by the page class management unit 420; a location in the second cache 42 where the page has been transferred; and a page information field and an auxiliary information field stored in the first cache 41. The auxiliary information field may be used to store a variety of necessary information. In an example, in a case in which link information of "class-2" pages is stored in a moving buffer, the information that can be stored in the auxiliary information field may include backlink information for accessing the moving buffer.

In response to the class of the page being determined, the page class management unit 420 may store the class ID of the determined class in the page node. The page class management unit 420 may set the "evictable-or-not" flag to "unevictable" for a "class-2" page so that the "class-2" page can be prevented from being arbitrarily discarded by an OS, and may set the "evictable-or-not" flag to "evictable" for a "class-3" page so that the "class-3" page can be discarded at any time by an OS.

In response to a "class-2" page being reclassified as "class-3" and thus becoming arbitrarily evictable by an OS, the page class management unit 420 may transmit update request information for updating metadata of the corresponding page to the second cache 42. In an example, the update request information may include the ID of a page to be updated and metadata such as "_to_be_discarded" indicating that the page to be updated can be arbitrarily discarded from the second cache 42 at any time. In this example, an auxiliary memory device including the second cache 42 may update the metadata of the page to be updated to "_to_be_discarded".

Figure 6A:
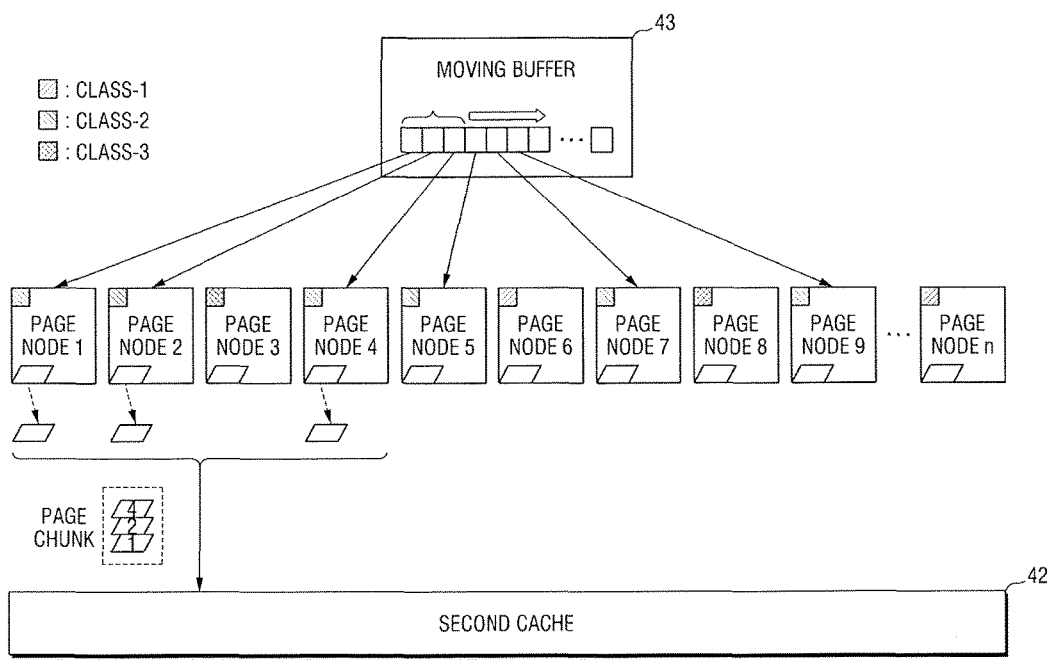
FIGS. 6A and 6B are diagrams illustrating an example of the transfer of pages, in units of page chunks, to a second cache.
Figure 6B:
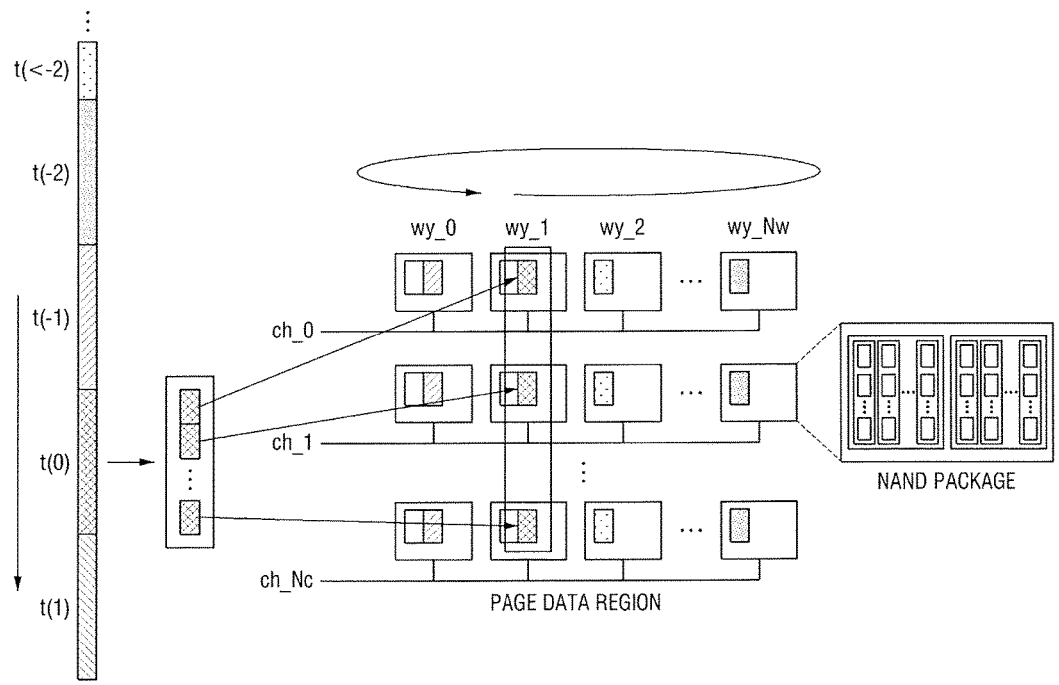

FIGS. 6A and 6B are diagrams illustrating an example of the transfer of pages, in units of page chunks, to a second cache.

Referring to FIGS. 4 and 6A, in response to there being link information of pages to be transferred to the second cache 42 in a moving buffer 43, the page transfer management unit 430 transfers the pages to the second cache 42 based on the link information. The page transfer management unit 430 may transfer pages to the second cache 42 according to a predetermined page transfer policy. In an example, in response to the occurrence of a system event such as an unexpected termination of a system, the page transfer management unit 430 transfers pages that are waiting in the moving buffer 43 to the second buffer 42.

In an alternative example, the page transfer management unit 430 transfers pages to the second cache 42 whenever a situation that meets a user-set page transfer policy occurs. The user-set page transfer policy may be a policy of transferring pages at regular intervals of time, a policy of transferring pages that meet a predetermined page chunk size condition, or a combination thereof.

In response to the user-set page transfer policy being a policy of transferring pages at regular intervals of time, the page transfer management unit 430 checks the moving buffer 43 for any link information at regular intervals of a predetermined amount of time. In response to there being link information in the moving buffer 43, the page transfer management unit 430 searches for and find pages corresponding to the link information from the first cache 41, generates write request information including data of the found pages, and transmits the write request information to the second cache 42. Alternatively, in response to the user-set page transfer policy being a policy of transferring pages that meet a predetermined page chunk size condition, the page transfer management unit 430 determines whether pages to be transferred satisfy the predetermined page chunk size condition based on the link information present in the moving buffer 43. Then, in response to the pages to be transferred satisfying the predetermined page chunk size condition, the page transfer management unit 430 generates write request information including data of the pages to be transferred and transmits the write request information to the second cache 42. The moving buffer 43 may be configured to have the same size as that of page chunks.

The size of page chunks may be determined based on the channel structure and erase block size of an auxiliary memory device (not illustrated) having the second cache 42. For example, the size of page chunks may be determined by the number of channels of the auxiliary memory device, multiplied by the erase block size of the auxiliary memory device.

The page transfer management unit 430 defers the transfer of pages to the second cache 42 according to the state of the auxiliary memory device, for example, the state of an SSD. The page transfer management unit 430 transmits size information of page data to the SSD, and the SSD transmits estimated standby time information, which is an estimate of the amount of time that it will take to secure storage space for the page data to be transferred, to the page transfer management unit 430. In an embodiment where the second cache 42 is distributed between a plurality of SSDs, an SSD array management layer (not illustrated) is additionally provided in the memory system to control a data I/O request to be processed in the second cache 42 of whichever of the plurality of SSDs is determined most suitable for storing the data to be transferred.

As illustrated in FIG. 6A, in response to the predetermined page chunk size condition being 3, the page transfer management unit 430 searches for and finds one or more "class-2" pages, i.e., pages 1, 2 and 4, generates a page chunk having a size of 3 based on the found "class-2" pages, and issues a write request for the generated page chunk to the second cache 42 by transmitting the generated page chunk to the second cache 42.

Referring to FIG. 6B, in response to the receipt of a write request at a time t(0), the auxiliary memory device divides an input page chunk into a plurality of page data based on the number of channels and erase block size thereof, and stores the plurality of page data on a channel-by-channel basis. As illustrated in FIG. 6B, in a case where the input page chunk of the time t(0) is written to, for example, a second column wy_1 of a NAND package, the auxiliary memory device writes a subsequent page chunk input thereto at a time t(1) to a third column wy_2 of the NAND package to be less affected by any latency in a write operation.

In response to the processing of a write request being complete, the auxiliary memory device transmits the results of the processing of the write request, i.e., processing result information, to the page transfer management unit 430. In an example, the processing result information includes information indicating whether the write request has been successfully processed, a location in the second cache 42 where a page chunk corresponding to the write request is stored (for example, the ID or the address of the page chunk in the second cache 42), and the remaining storage capacity of the second cache 42. The page transfer management unit 430 may update second cache storage location information in each page node corresponding to the page chunk, and if necessary, may transmit a request for securing available storage space to the second cache 42.

Figure 7A:
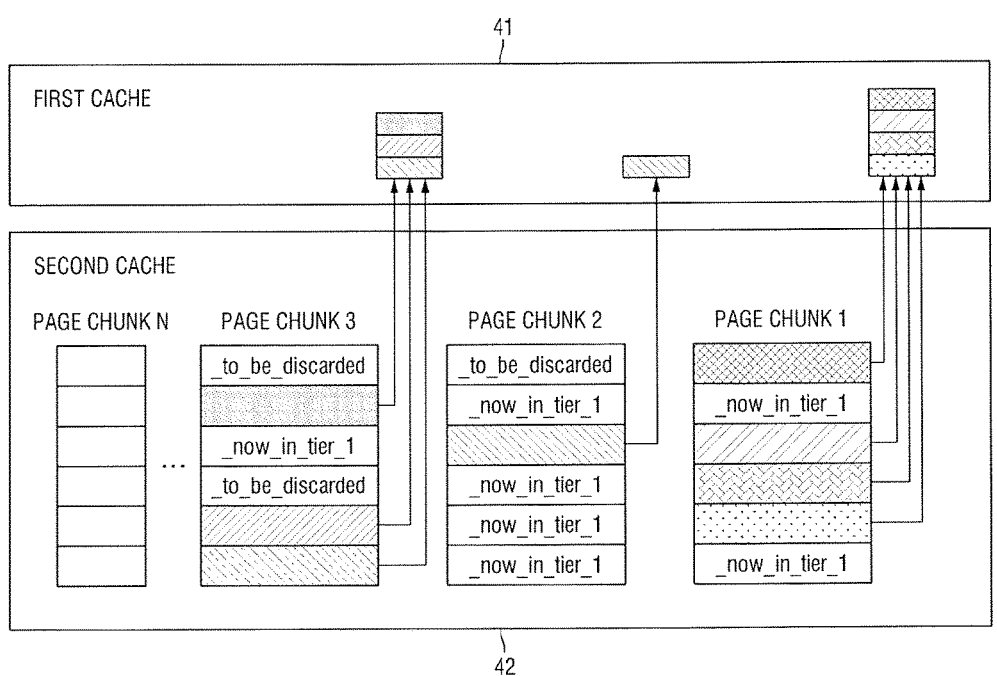
FIGS. 7A and 7B are diagrams illustrating an example of the securing of available storage space in the second cache.
Figure 7B:
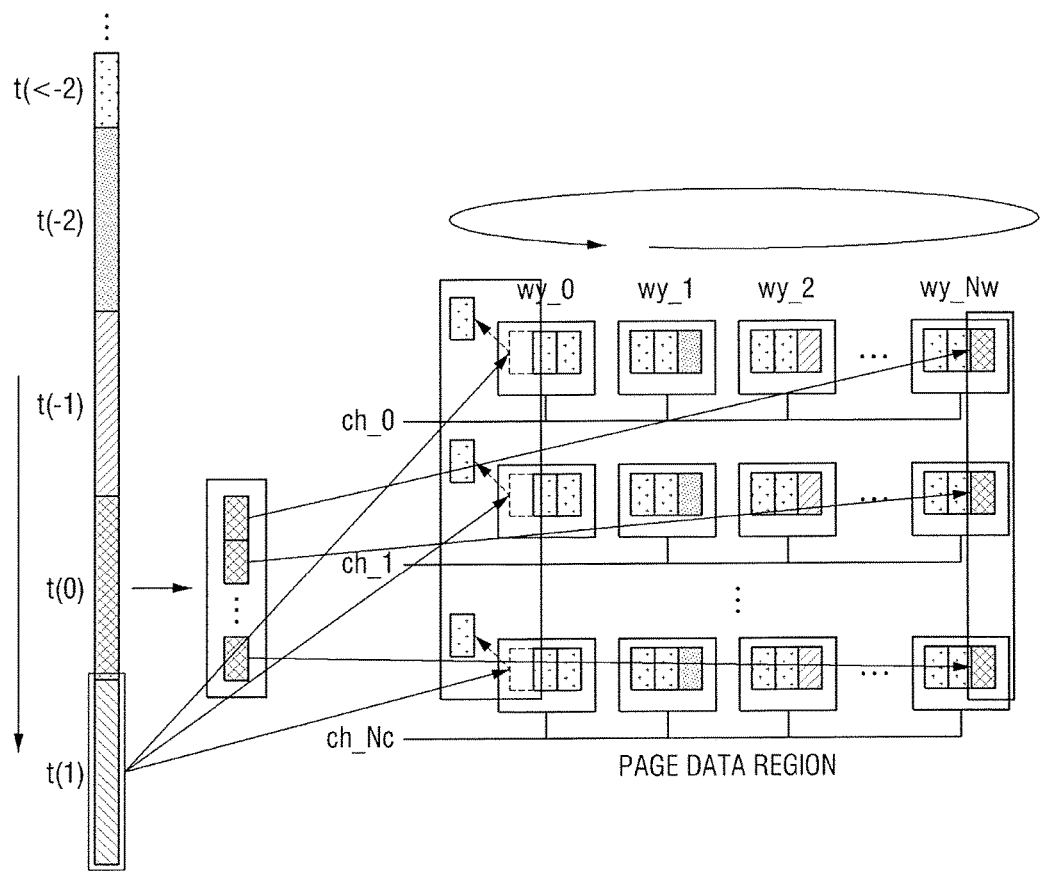

FIGS. 7A and 7B are diagrams illustrating an example of the securing of available storage space in the second cache 42.

Referring back to FIG. 4, the page transfer management unit 430 determines whether there is sufficient storage space in the second cache 42 for storing pages based on remaining storage space information of the second cache 42. In response to there not being sufficient storage space in the second cache 42 for storing pages, the page transfer management unit 430 transmits storage space request information to the second cache 42, requesting that the second cache 42 secure available storage space. In an example, the page transfer management unit 430 receives write request result information, including information indicating whether a current write request has been successfully processed and the remaining storage space information of the second cache 42, from the auxiliary memory device, or receives the remaining storage space information of the second cache 42 alone at regular intervals of time. In this example, the page transfer management unit 430 determines whether there is sufficient storage space in the second cache 42 for processing a subsequent write request based on the write request result information or the remaining storage space information of the second cache 42. In response to a determination being made that there is insufficient storage space available in the second cache 42 for processing the subsequent write request, or that the amount of storage space remaining in the second cache 42 is less than a predefined threshold, the page transfer management unit 430 transmits required storage space information indicating the amount of additional storage space that needs to be secured to the second cache 42.

In response to the receipt of the storage space request information, the auxiliary memory device secures storage space in the second cache 42 according to a predefined policy. In an example, in response to the predefined policy being a policy of erasing page chunks in order of when they were stored and page chunks 1 to N being sequentially stored in the second cache 42, as illustrated in FIG. 7A, a number of page chunks are erased, beginning from page chunk 1. In an alternative example, in response to the predefined policy being a policy of erasing pages in order of the amount of predetermined metadata included therein, page chunk 2 is erased first.

The auxiliary memory device may request that any valid page included in each page chunk erased for securing storage space be stored in the first cache 41. As a result, the page transfer management unit 430 determines whether to store page chunks to be erased from the second cache 42 in the first cache 41 based on available storage space information of the first cache 41, and then stores the page chunks in the first cache 41 before the page chunks are erased from the second cache 42.

Referring to FIG. 7B, at a time t(0), the auxiliary memory device anticipates the time when a next page chunk will be received, i.e., a time t(1), based on the interval at which a page chunk write request is received from the page transfer management unit 430, and erases a page chunk before the arrival of the time t(1). In an example, in response to a page chunk received at the time t(0) being stored in a last column wy_Nw of the NAND package, the auxiliary memory device erases the page chunk in the first column wy_0 at an arbitrary moment before the time t(1). As a result, in response to a page chunk being received at the time t(1), the page chunk is stored in the NAND package without being affected by an erase operation performed on the first column wy_0 for securing necessary storage space therefrom. Accordingly, the I/O speed of the auxiliary memory device can be improved.

The auxiliary memory device may take a snapshot of page data and metadata managed in the second cache 42, and may store the snapshot in another region. The snapshot may be stored not only in the auxiliary memory device but also in another auxiliary memory device to which the second cache 42 is not allocated. For example, the snapshot may be stored in an auxiliary memory device other than the one that includes the second cache 42. The snapshot may be stored in case of a hybrid page cache shutdown, an entire system shutdown, or a predetermined trigger event. Accordingly, in a hybrid page cache bootstrap, the amount of time that it takes to warm up a cache can be reduced by uploading the entire snapshot or some of the metadata onto a memory.

Figure 8:
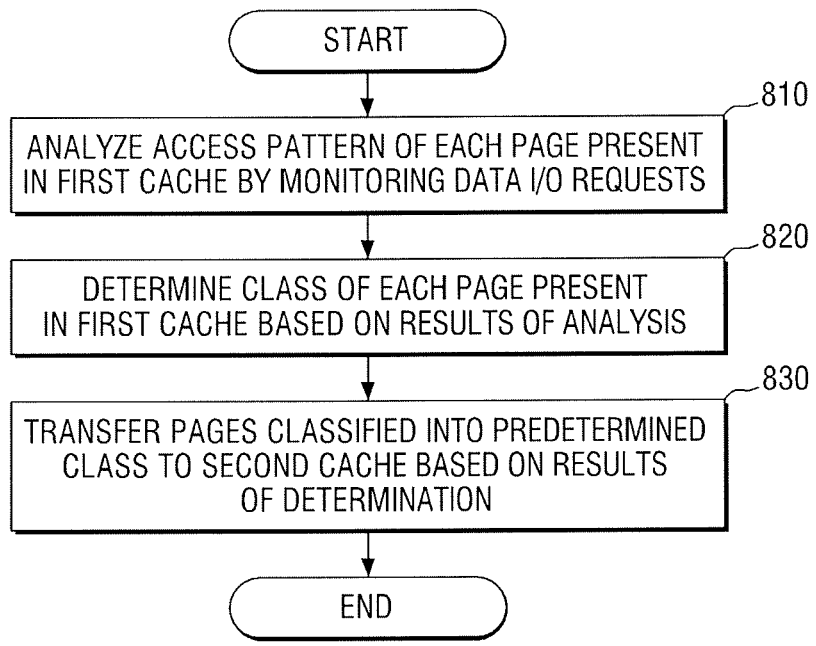
FIG. 8 is a flowchart illustrating a cache management method of a hybrid page cache memory system, according to an exemplary embodiment of the inventive concept.
Figure 9:
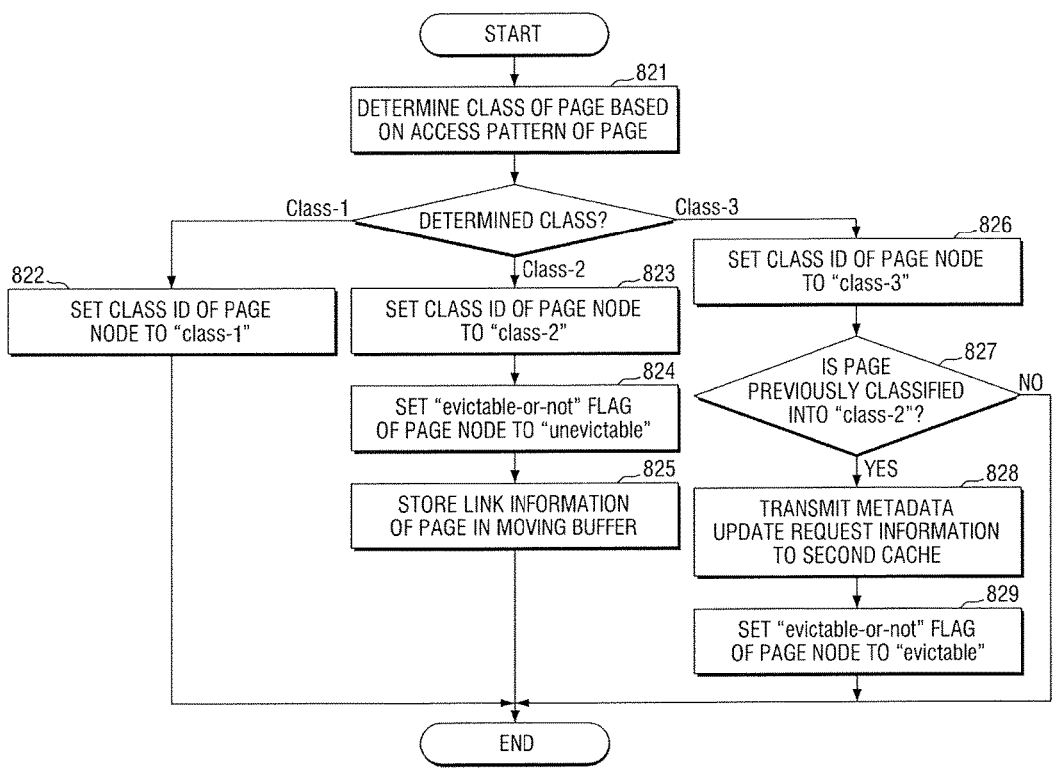
FIG. 9 is a flowchart illustrating an example of the determination of a page class as performed in the cache management method.
Figure 10:
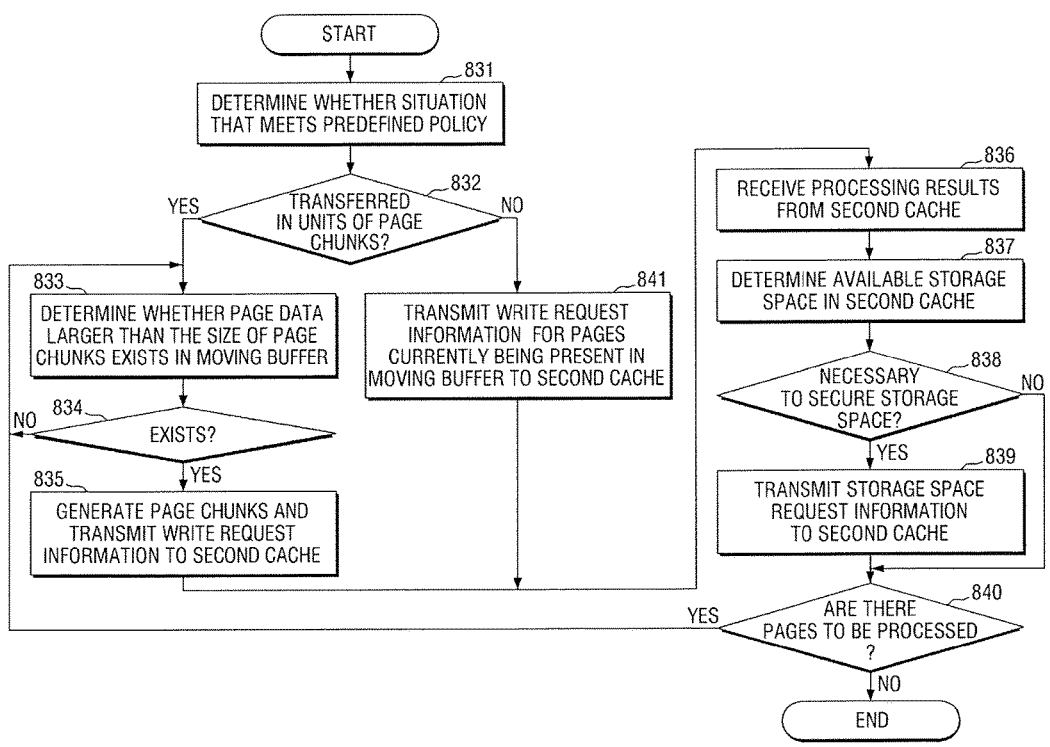
FIG. 10 is a flowchart illustrating an example of the transfer of a page to a second cache as performed in the cache management method.

FIG. 8 is a flowchart illustrating a cache management method of a hybrid page cache memory system, according to an exemplary embodiment of the inventive concept, FIG. 9 is a flowchart illustrating an example of the determination of a page class as performed in the cache management method, and FIG. 10 is a flowchart illustrating an example of the transfer of a page to a second cache as performed in the cache management method.

The cache management method of FIGS. 8 to 10 may be performed by the cache management apparatus 350 of the hybrid page cache memory system 300 of FIG. 3A. The description of the hybrid page cache memory system 350 is applicable to the cache management method, and thus, the cache management method will hereinafter be described briefly with reference to FIGS. 8 to 10.

Referring to FIG. 8, a cache management apparatus monitors data I/O requests, and analyzes the access pattern of each page present in a first cache (810). In an example, the access pattern of a page may be analyzed by calculating the number of data I/O requests that have been issued for the page for a predefined amount of unit time, i.e., an access count, or calculating the interval at which a data I/O request is issued for the page, i.e., an access interval.

In response to the analysis of the access pattern of each page present in the first cache being complete, the cache management apparatus determines the class of each page present in the first cache based on the results of the analysis (820).

An example of the determination of the class of a page will hereinafter be described with reference to FIG. 9. Referring to FIG. 9, the class of a page is determined based on the results of the analysis of the access pattern of the page (821).

The page may be classified into one of "class-1", "class-2", and "class-3". In response to the page being classified as "class-1", a class ID in a page node corresponding to the page is set to "class-1" (822). In response to the page being classified as "class-2", the class ID in a page node corresponding to the page is set to "class-2" (823). To prevent the page from being arbitrarily discarded from a first cache by an OS, an "evictable-or-not" flag in the page node is set to "unevictable" (824). Link information of the page is stored in a moving buffer (825).

In response to the page being classified as "class-3", the class ID in the page node is set to "class-3" (826), and a determination is made as to whether the page was previously classified as "class-2" (827). In a case in which the previous class of the page is "class-2", it is highly likely that the page is also stored in a second cache. Accordingly, information requesting that metadata of the page be updated to "_to_be-_discarded" may be transmitted to the second cache (828).

The "evictable-or-not" flag in the page node is set to "evictable" (829) so that the page can be discarded at any time by the OS.

Referring back to FIG. 8, in response to the determination of the class of each page present in the first cache being complete (820), one or more pages classified as "class-2" are transferred to the second cache (830).

An example of the transfer of a "class-2" page to the second cache will hereinafter be described with reference to FIG. 10. Referring to FIG. 10, the cache management apparatus determines whether a situation that meets a predefined page transfer policy has occurred (831). In response to a determination being made that a situation that meets the predefined page transfer policy has occurred, the cache management apparatus determines whether to transfer pages to the second cache in units of page chunks (832). In an example, a user may request all pages present in the moving buffer to be transferred to the second cache either in response to the occurrence of a system event or at regular intervals of time. In this example, the pages in the moving buffer are set to be transferred to the second cache in units of page chunks. In another example, whenever page data having the size of a page chunk is gathered in the moving buffer, the page data is transferred to the second cache on a page chunk-by-page chunk basis.

In response to a determination being made to transfer pages to the second cache in units of page chunks (832), the cache management apparatus determines whether page data larger than the size of a page chunk exists in the moving buffer (833). In response to there being page data larger than the size of a page chunk in the moving buffer (834), a page chunk is generated, and write request information for the generated page chunk is transmitted to the second cache (835). In a case in which page data is not to be transferred to the second cache in units of page chunks, write request information for a page currently being present in the moving buffer is transmitted to the second cache (841).

The cache management apparatus receives the results of the processing of the write request information from the second cache (836), and determines the amount of storage space available in the second cache based on the received processing results (837). In response to a determination being made that available storage space needs to be secured in the second cache (838), the cache management apparatus transmits storage space request information to the second cache (839). The cache management apparatus may calculate the amount of storage space that needs to be secured in the second cache based on the interval at which a page chunk is transmitted to the second cache, and may transmit the results of the calculation to the second cache as required storage space information.

In response to there being pages yet to be processed in the moving buffer (840), the cache management method returns to operation 833. In response to there being no pages remained in the moving buffer (840), the cache management method ends.

According to the cache management method of at least one embodiment of the invention, pages that are frequently requested by data I/O requests are controlled to be serviced from a first cache, and pages that are not requested by data I/O requests for a first predetermined amount of time managed by the kernel of an OS, but have the potential to be requested soon (e.g., those predicted to be requested within a second amount of time after the first amount of time) are stored in a second cache and can thus be serviced from the second cache. Therefore, it is possible to improve the cache hit ratio of the second cache while preventing unnecessary data from being stored in the second cache.

The processes, functions, methods, and/or software described herein (e.g., 400 of FIG. 4, steps of FIG. 8, FIG. 9, and FIG. 10, etc.) may be recorded, stored, or fixed in one or more computer-readable storage media that includes program instructions to be implemented by a computer to cause a processor to execute or perform the program instructions. For example, the cache management apparatuses 350 and 400 could be implemented by the processor. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

While the present inventive concept has been particularly shown and described with reference to exemplary embodiments thereof, it will be understood by those of ordinary skill in the art that various changes in form and detail may be made therein without departing from the spirit and scope of the present inventive concept.

What is claimed is:

1. A cache management apparatus, comprising:
an access pattern analysis unit configured to analyze an access pattern of each of one or more pages present in a first cache by monitoring data input/output (I/O) requests;
a page class management unit configured to determine a class of each of the pages based on results of the analysis performed by the access pattern analysis unit; and
a page transfer management unit configured to transfer one or more pages classified into a first class including pages to be transferred, to a second cache based on results of the determination performed by the page class management unit,
wherein the first class indicates the included pages are not frequently accessed,
wherein the page class management unit is further configured to in response to a page being classified into the first class, update node information of the page to prevent the page from being arbitrarily discarded by an operating system (OS).

2. The cache management apparatus of claim 1, wherein the first cache is located within a random access memory (RAM)-based main memory device and the second cache is located within an auxiliary memory device including a solid-state drive (SSD).

3. The cache management apparatus of claim 1, wherein data accessed from the auxiliary memory device or the second cache in response to a data I/O request is stored in the first cache and some of the data stored in the first cache is selectively stored in the second cache.

4. The cache management apparatus of claim 1, wherein the access pattern analysis unit is further configured to calculate an access count, which is a number of data I/O requests issued for a predetermined amount of unit time for each page, and analyze the access pattern of each of the pages present in the first cache based on the calculated access counts of the corresponding pages.

5. The cache management apparatus of claim 1, wherein the access pattern analysis unit is further configured to calculate an access interval, which is an interval at which a data I/O request is issued for each page, and analyze the access pattern of each of the pages present in the first cache based on the calculated access intervals of the corresponding pages.

6. The cache management apparatus of claim 1, wherein the page transfer management unit is further configured to transfer the pages classified into the first class to the second cache according to one of a policy of transferring pages upon the occurrence of a system event, transferring pages at regular intervals of time, transferring pages in units of page chunks, and a combination thereof.

7. The cache management apparatus of claim 6, wherein the size of the page chunks is determined based on properties of an auxiliary memory device to which the second cache is located within, the properties including at least one of a channel structure and erase block size of the auxiliary memory device.

8. The cache management apparatus of claim 1, wherein the page class management unit is further configured to in response to a page being classified into the first class, store link information of the page in a moving buffer, and the page transfer management unit is further configured to transfer the page from the first cache to the second cache based on the link information stored in the moving buffer.

9. The cache management apparatus of claim 1, wherein the page class management unit is further configured to in response to a page of the first class being reclassified to a second class including pages that are configured to be arbitrarily discarded by an operating system (OS), transmit update request information to the second cache, requesting that metadata of the reclassified page be updated to indicate that the reclassified page is ready to be discarded from the second cache at any arbitrary time.

10. The cache management apparatus of claim 1, wherein the page class management unit is further configured to in response to a page being reclassified from the first class to a second class including pages that are configured to be arbitrarily discarded by an operating system (OS), update page node information of the reclassified page to enable the reclassified page to be discarded from the first cache by an OS.

11. The cache management apparatus of claim 1, wherein the page transfer management unit is further configured to determine whether there is sufficient storage space in the second cache based on remaining storage space information of the second cache and in response to there not being sufficient storage space in the second cache, transmit storage space request information to the second cache, requesting that the second cache secure available storage space.

12. The cache management apparatus of claim 1, wherein the first class further indicates the included pages are predicted to be accessed in the near future.

13. A memory system, comprising:
a main memory device configured to include a first cache;
an auxiliary memory device configured to include a second cache; and
a cache management apparatus configured to analyze an access pattern of each of one or more pages present in the first cache by monitoring data I/O requests, to determine a class of each of the pages based on results of the analysis, and to transfer one or more pages classified into a first class including pages to be transferred to the second cache based on results of the determination,
wherein the main memory device is further configured to include a moving buffer and the cache management apparatus is further configured to in response to a page being classified into the first class, store link information of the page in the moving buffer.

14. The memory system of claim 13, wherein data accessed from the auxiliary memory device or the second cache in response to a data I/O request is stored in the first cache and some of the data stored in the first cache is selectively stored in the second cache.

* * * * *